Patented Feb. 12, 1952

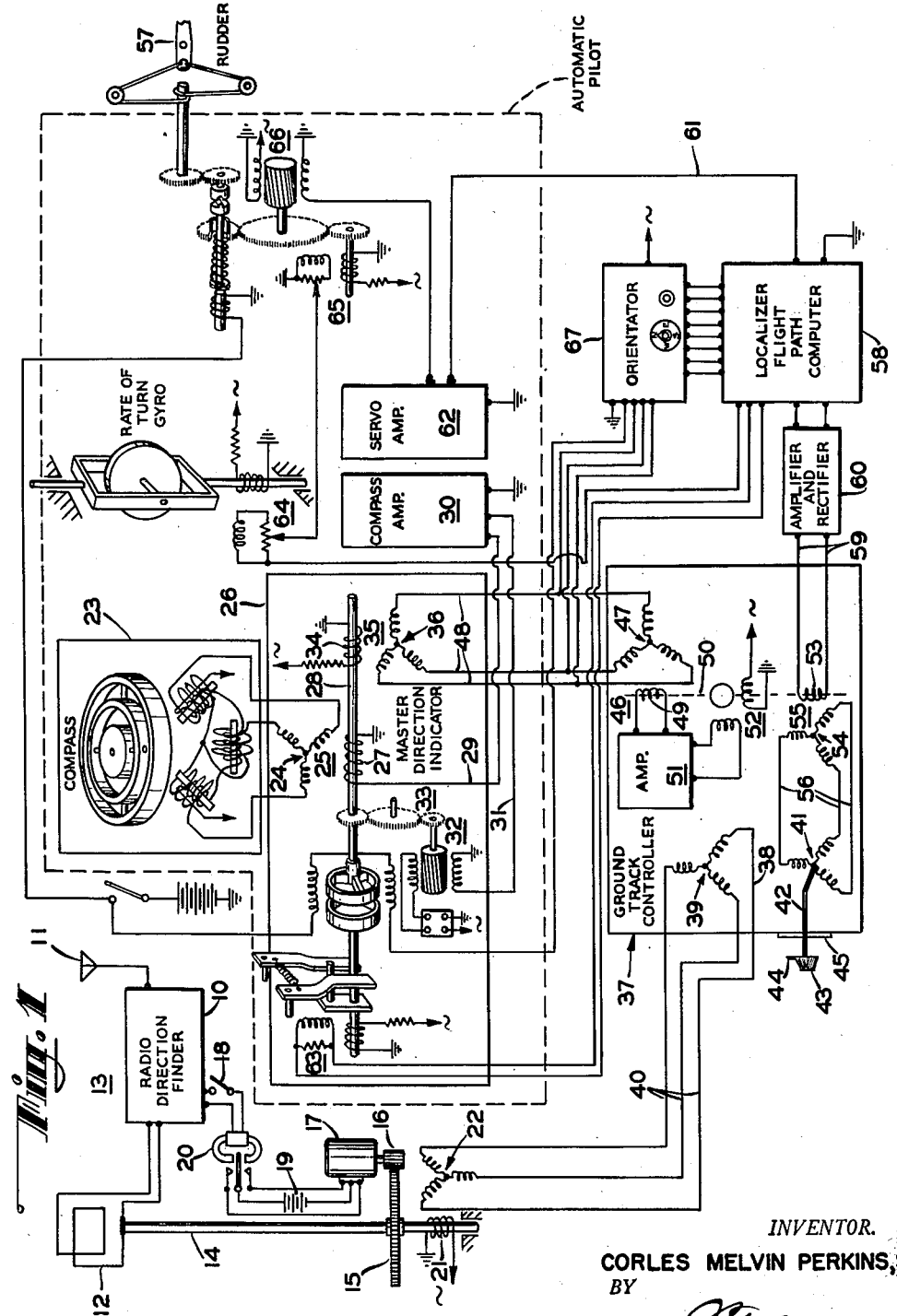

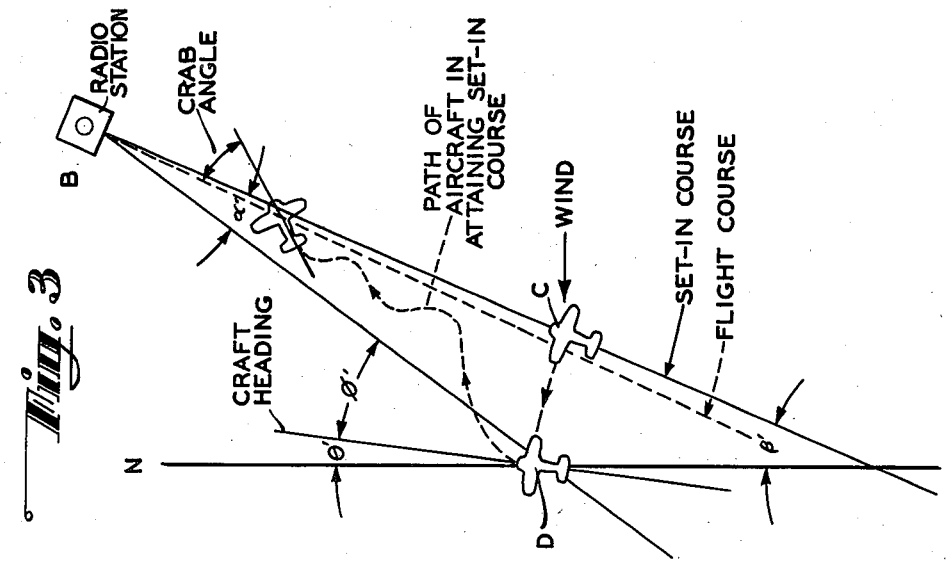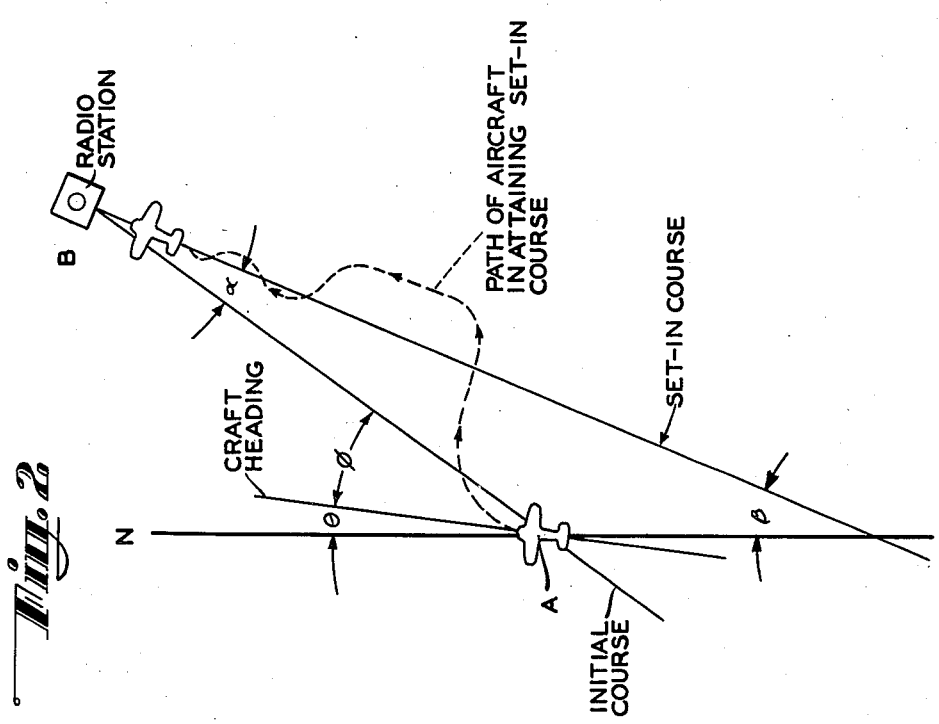

2,585,164

UNITED STATES PATENT OFFICE 2,585,164

RADIO NAVIGATION SYSTEM

Corles Melvin Perkins, Sr., Rutherford, N. J., assignor to Bendix Aviation Corporation, Teterboro, N. J., a corporation of Delaware Application October 23, 1947, Serial No. 781,651

7 Claims. (Cl. 343—117)

This invention relates to radio navigation systems and more particularly to systems of such character whereby a moving craft, such as a water or air craft, for example, will follow a homing course on a radio transmitter.

Systems of this general character are adopted for automatically steering a craft along a pre-selected course or ground track toward a radio transmitter located at a desired destination by utilization of error signals resulting from craft deviations from the pre-selected course, i. e., signals developed as a result of the difference between the initial radio bearing and the new radio bearing caused by displacement of the craft from the pre-selected course by side winds, for example.

While various expedients have been heretofore utilized in the prior art for pre-selecting a desired course or ground track in systems of the above character, the present invention contemplates the provision of a novel and improved expedient in the form of a ground track controller unit which receives both a magnetic compass and a radio compass signal, both signals being separately available as such for other uses where desired, and includes a pre-setting feature by virtue of which a desired pre-selected course or ground track references may be manually established.

An object of the present invention, therefore, is to provide a novel navigation system operative with any desired radio broadcasting station for automatically directing and/or maintaining a craft upon any arbitrarily selected course or ground track.

Another object of the invention is to provide novel ground track control apparatus in which signals developed by a magnetic compass and a radio compass are compared with a manually pre-selected reference to provide a resultant control signal representing in phase and magnitude the direction and amount of angular departure of the craft from the initial radio bearing.

A further object is to provide a novel automatic steering system for mobile craft which, in response to received magnetic and radio compass signals compared with an arbitrarily chosen fixed course reference, directs and/or maintains the craft upon the course or ground track defined by the chosen reference.

Another object is to provide in an automatic steering system for mobile craft, a novel ground track controller unit wherein by the selection of a desired fixed reference, representing a desired ground track, radio and magnetic compass signals, developed at a relatively remote point are modified in the unit by the reference to provide a resultant control signal, representing in polarity and magnitude the direction and amount of angular deviation by the craft from the fixed reference, which is communicated to the steering system to maintain the craft on the desired ground track.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustrative purposes only, and are not to be construed as defining the limits of the invention.

In the drawings, Figure 1 is a schematic arrangement of one form of novel apparatus embodying the present invention shown in connection with an automatic pilot for controlling craft flight;

Figure 2 is a diagram depicting the path of a moving craft which, by means of the present invention, is automatically directed from its initial course to a new pre-selected course or ground track and maintained thereon toward a desired destination; and, Figure 3 is a diagram similar to that of Figure 2 in which the craft return path is illustrated when side winds have displaced the craft from the desired ground track.

For a better understanding of the principles underlying the present invention, reference is made to the diagram of Figure 2 of the drawings wherein is illustrated the path of flight of a moving craft, resulting from the use of the novel apparatus hereof, from an initial course to a pre-selected course or ground track. It may be assumed that the craft is at some position A having a magnetic heading of $\theta$ degrees and a bearing of $\phi$ degrees relative to a broadcasting station B located at a desired destination and that it is desired to fly to the station on a pre-selected course or ground track having a magnetic bearing of $\beta$ degrees. The angle of deviation required to direct the craft from its initial position A to the pre-selected course, therefore, will be the algebraic difference between the magnetic bearing of the craft relative to the radio station and the magnetic bearing of the pre-selected course. This relation may be stated in the form of the following equation:

$$a = (\theta + \phi) - \beta$$

where, $a$ = the angle of deviation of the craft from the pre-selected course or ground track,
$\theta$ = the magnetic heading of the craft,
$\phi$ = the craft radio compass bearing, and,
$\beta$ = the magnetic bearing of the pre-selected course or ground track.

Referring now to Figure 1 of the drawings, the novel apparatus of the present invention for directing the craft to a pre-selected course or ground track and for maintaining it thereon comprises a radio direction finder or compass 10 including a non-directional antenna 11, a directional antenna 12 and a radio receiver 13 which, in a known manner, develops at its output a signal representing the radio compass bearing relative to a source of radio waves emanating from a desired station. With the loop of directional antenna 12 maintained at its null position, i. e., at right angles to the direction of propagation of the received radio waves, the signal at the output of receiver 13 drops to zero. The zero position of antenna 12 is established by setting the loop thereof at right angles with the fore and aft axis of the craft. When the craft's heading does not deviate from a prescribed course leading to the desired source of radiant energy, the null position of the loop of antenna 12 coincides with its zero position.

Deviation or displacement of the craft's heading from the prescribed course produces relative displacement between the position of the loop of antenna 12 and the radio transmitter developing a displacement signal at the output of receiver 13. The directional antenna is mounted for angular displacement by a freely rotatable shaft 14 carrying a gear 15 thereon which meshes with a pinion 16 secured to the shaft of a reversible motor 17. Assuming a switch 18 to be closed, motor 17 is energized from a battery 19 by means of a polarized relay 20 in response to the output signal of receiver 13 to angularly displace antenna 12 to a new null position relative to the radio transmitter whereupon the receiver output signal drops to zero to de-energize the motor.

In addition to displacing directional antenna 12, motor 17 also angularly displaces a rotor winding 21, energized from a suitable source of current, relative to an inductively coupled three phase wound stator 22 to develop in the latter a signal proportional to the radio compass bearing from the craft to the station as determined by the amount of angular deviation of antenna 12 from its zero position, i. e., relative to the craft fore and aft axis.

As more fully described in copending application Serial No. 516,488 filed December 31, 1943, a signal proportional to the craft magnetic heading is derived from a gyro-stabilized earth inductor compass 23. The signal developed by the compass is impressed by way of suitable leads to a three phase wound stator 24 of an inductive coupling device 25, located within a master direction indicator 26, to induce within an inductively coupled rotor winding 27 thereof, mounted for angular displacement relative to its stator by way of a shaft 28, a signal proportional to the craft change of magnetic heading. The signal induced within rotor winding 27 is applied by means of a lead 29 to the input of an amplifier 30, the output of which is impressed by means of a lead 31 upon the variable phase of a two phase motor 32, whose fixed phase is energized from a suitable source of alternating current, to cause rotation of the motor in a direction to drive rotor winding 27 to a null position relative to its stator, by way of a speed reduction gear system 33, and to also angularly displace a rotor winding 34 of a signal transmitter 35, carried by shaft 28, from its null position relative to an inductively coupled three phase stator 36 to induce in the latter a signal resulting from the angular change of craft heading.

The novel ground track controller unit of the present invention which receives both the radio compass signal and the magnetic compass signal is generally designated with the reference character 37 in Figure 1. Such unit consists of an inductive course setting device 38 comprising a fixed three phase wound stator 39 connected by way of leads 40 to stator 22 to receive the radio compass signal developed in the latter and an angularly displaceable and inductively coupled three phase wound rotor 41 which is settable relative to its stator by virtue of a shaft 42 having a knob 43 secured thereto exterior of unit 37, the knob being provided with a fixed index 44 and being settable relative to a fixed card 45 which may be calibrated from 0° to 360° as a compass card. By manipulating knob 43 relative to card 45 any desired pre-selected course or ground track to be followed by the craft to a desired radio station may be inserted manually into unit 37.

Unit 37, moreover, includes an inductive receiver device 46 comprising a three phase wound stator 47 connected to stator 36 of signal transmitter 35 by way of leads 48 to receive the magnetic compass signal developed in the latter stator and an inductively coupled single phase wound rotor 49. The magnetic compass signal developed at signal transmitter 35 is induced within rotor winding 49, which is carried by an angularly displaceable shaft 50, and fed therefrom to the input of an amplifier 51, the output of which is impressed on the variable phase of a two phase motor 52, the fixed phase of which is energized from a suitable source of current as is well known with torque amplifier devices of this character. In response to a magnetic compass signal appearing in rotor 49 of receiver 46, therefore, motor 52 is energized to drive rotor 49 to a null position relative to stator 47 wherein the signal drops to zero and motor 52 is de-energized.

In driving rotor winding 49 to a null, motor 52 also angularly displaces a further rotor winding 53, carried by shaft 50, relative to its inductively coupled three phase wound stator 54 of a further inductive receiver device 55. The stator of the latter device is connected by way of leads 56 with three phase wound rotor 41 of course setting device 38.

Angular deviation of directional antenna 12, due to change in loop bearing relative to the transmitting station, causes displacement of rotor winding 21 relative to stator 22 to set up in the latter a flux vector whose space position or phase with respect to rotor and stator windings 21 and 22 is a direct function of their related positions. A corresponding flux vector change occurs in stator 39 of the course setting device so that for any angular deviation of antenna 12 a corresponding deviation results in the space position or phase of the flux vector in stator windings 39.

Course setting device 38 acts as a flux vector phase shifter so that in response to angular displacement of rotor winding 41 by way of knob 43 relative to stator windings 39 the space position of the flux vector produced by stator windings 39 is altered with respect to rotor 41 and communicated to stator windings 54 of inductive receiver 55, such change being a direct function of the angular displacement of rotor winding 41 relative to its stator 39. Displacement of rotor winding 41 of device 38 in a direction opposite to the direction of deviation of the space position of the flux vector of stator windings 39, due to the angular displacement of antenna 12, by an amount equal to the magnetic bearing $\beta$ of the preselected course or ground track decreases, in effect, the deviation of the space position of the flux vector at wound stator 54 by an amount directly equal to the magnetic bearing of the preselected ground track. Thus, the resultant space position of the flux vector at stator 54 after the insertion of the desired course or ground track of $\beta$ degrees is at all times directly equal to the difference between the radio compass bearing from the craft to the station and the magnetic bearing of the pre-selected course or ground track, i. e., $(\phi - \beta)$.

Displacement of rotor winding 34 of signal transmitter 35 relative to its wound stator 36, as a result of craft change of heading, develops a signal in rotor winding 49 of receiver 46 whose magnitude and phase is a measure of the amount and direction of the craft change of heading. Motor 52 is energized in response to the latter signal to drive rotor 49 to a null relative to its stator 47 whereupon the motor is de-energized, rotor 53 being likewise displaced by the motor relative to its wound stator 54. Rotor 53 is displaced angularly in the same direction as the direction of deviation of the space position of the flux vector in wound stator 39, resulting from displacement of antenna 12, and in an amount equal to the craft magnetic heading ($\theta$) so that there is induced in rotor winding 53 a signal representing, at all times, in phase and magnitude, the direction and amount of the angular deviation of the aircraft from the pre-selected course or ground track.

For calibration purposes the zero position of course setting device 38 may be initially achieved on the ground prior to craft flight. To this end, the craft is maneuvered to bring its heading, i. e., its fore and aft axis, parallel with magnetic north. As a result, rotor winding 53 of unit 37 is displaced by motor 52 to assume a definite angular relation with respect to its related wound stator 54. Antenna 12 is angularly displaced, thereafter to bring its loop to a position at right angles to the fore and aft axis of the craft. In so positioning antenna 12, rotor winding 21 is angularly displaced therewith to assume a definite position relative to its wound stator 22 whereby a definite signal resulting in a flux vector having a space position or phase dependent on the signal is developed at the stator and repeated at wound stator 39 of course setting device 38. A proportional signal is induced in rotor winding 41 which is impressed on wound stator 54 to induce a corresponding signal in rotor winding 53, the signal at the latter stator resolving into a flux vector having the same space position or phase as the flux vector appearing at wound rotors 22 and 39. Thereupon, wound rotor 41 of the course setting device is angularly displaced relative to wound stator 39 by way of knob 43 until the flux vector present in wound stator 54 is displaced angularly in a direction opposite to the original direction of movement of the flux vector until the flux vector attains a position normal to the electrical axis of wound rotor 53 at which time the signal at the latter rotor drops to zero. This is the zero position for the course setting device, i. e., a position in which index 44 of knob 43 coincides with the zero graduation on card 45.

The signal appearing at wound rotor 53 may be utilized to operate a craft rudder 57 through a conventional automatic pilot system to bring a craft embodying the novel arrangement hereof to a pre-selected course or ground track. However, since such an error signal is proportional to the angular deviation of the craft from a pre-selected course, it has the known disadvantages surrounding controls utilizing such a displacement signal. For example, when the signal is of such a character as to provide the desired craft control some distance away from the station, it will provide over control as the radio station is approached.

To eliminate this latter disadvantage, the error signal appearing at rotor winding 53 of unit 37 is fed into a localizer flight path computer unit 58, of the character more fully shown and described in copending application Serial No. 705,524, filed October 25, 1946, by way of leads 59 and an amplifier and rectifier unit 60 so that the error signal ultimately fed into the computer unit is a direct current signal similar to the D. C. signal appearing at the cross-pointer meter of the last mentioned application. As more fully described in the latter application, the signal output of unit 58 will be proportional not to the angle of displacement of the craft from the pre-selected course but rather to the length of time that the craft remains from the pre-selected course.

The output of computer unit 58, mixed with the compass displacement signal developed by a signal transmitter 63, is fed by way of a lead 61 to the rudder channel, and where desired to the aileron channel as well, of a servo amplifier 62, of an automatic pilot system of the character more fully described in aforementioned copending application Serial No. 516,488, to be mixed with a rate of turn signal developed by a signal pick-off 64 and a follow-up signal developed by an inductive device 65, the output of amplifier 62 energizing a driving motor 66 for operating the rudder.

Since craft heading may not necessarily be parallel to the pre-selected course or ground track when a craft, embodying the novel arrangement of the present invention, has been brought to the desired ground track developing some instability in the control system, an automatic orientator unit, generally designated with the reference character 67, may be utilized which will engage the magnetic compass into the flight computer unit only when the craft has attained an inbound heading relative to an artificial direction beam reference set up by course setting device 38. For a more detailed showing and description of the operation of orientator unit 67 reference is made to copending application Serial No. 774,956, filed September 19, 1947.

Coming now to the operation of the novel arrangement of the present invention it may be assumed that a craft, provided with the system hereof, is at some position A (Figure 2) having a magnetic heading of $\theta$ degrees and a radio bearing of $\phi$ degrees to a radio transmitter B located at a desired landing field and that it is desired to fly toward the transmitter along a pre-selected course or ground track having a magnetic bearing of $\beta$ degrees. The pilot closes switch 18 of radio compass or direction finder 10 to energize the latter and inserts the desired course or ground track to be followed into ground track controller unit 37 by operation of knob 43 through an angle of $\beta$ degrees and also engages orientator 67 and localizer flight path computer 58 with the automatic pilot controlling position of rudder 57.

Energization of radio direction finder 10 causes orientation of directional antenna 12 relative to transmitter B so that its loop is always positioned at right angles to the transmitter causing signal transmitter 21—22 to produce a signal representing, at all times, in phase and amount, the radio compass bearing from the craft to the station. The signal developed by orientation of antenna 12 is inserted into course setting device 38 which, having been set for a course or ground track of $\beta$ degrees, modifies the directional antenna signal by subtracting from the latter an amount representing in phase and amount, the direction and amount of magnetic bearing $\beta$.

Compass 23 creates a signal representing in phase and amount, the direction and amount of deviation of craft magnetic heading and, in reproducing such signal in wound rotor 9 of receiver 46 located in unit 37, motor 52 is energized to displace rotor winding 53 relative to its wound stator 54. As a result thereof the craft magnetic heading is added to inductive device 55 in whose stator 54 appears the signal due to orientation of antenna 12 as modified by the angle $\beta$. The resultant or error signal, therefore, appearing at rotor winding 53 represents in phase and magnitude the direction and amount of angular deviation of the craft from the pre-selected course or ground track since it represents $\phi+\theta-\beta$, where $\phi$ is transmitted from the radio compass, $\beta$ is subtracted therefrom by differential device 38, and $\theta$ is added mechanically by displacement of rotor winding 53 relative to stator 54 of inductive device 55.

The error signal developed by ground track controller unit 37, when amplified and rectified in unit 60, is fed into localizer flight path computer 58 and orientator 67 to develop a turn signal in response to which the automatic pilot actuates rudder 57 to direct and maintain the craft upon the pre-selected course or ground track in the manner more fully described in aforementioned pending applications Serial No. 705,524 and Serial No. 774,956.

Having once attained the desired course as defined by manual operation of course setting device 38, the craft will be substantially maintained on the pre-selected course even though side winds may cause a temporary deviation therefrom. If, for example, the craft has attained a position C, Figure 3, on the desired course, having the aforementioned magnetic bearing of $\beta$ degrees, and is forced from the course by side winds to some position D in which the magnetic heading of the craft has also been changed, ground track controller unit 37 will develop an error signal in rotor winding 53 representing, at all times, with respect to the radio transmitter, in phase and amount, the direction and amount of angular deviation of the craft from the pre-selected course or ground track. In response to such error signal, localizer unit 58 energizes the automatic pilot to return the craft toward the preselected course. If the heading of the craft on its approach to the pre-selected course is such a direction that the side winds are not fully compensated, the craft will be caused to drift away again somewhat without attaining the desired course whereupon a new error signal will be developed at the output of ground track controller 37. The process of moving toward the desired course and drifting therefrom is repeated until the craft on its approach to the course acquires a heading having a direction sufficient to compensate for the disturbing wind forces. The displacement of craft heading relative to the desired course brings into being a counteracting compass signal within computer 58 which balances or "washes out" an equal and opposite error signal developed at the ground track controller unit output so that no further turn signal is inserted into the automatic pilot causing the craft to fly more or less sidewise or to "crab" along a course toward the radio transmitter which will be displaced slightly from the preselected course by an amount measured by the error signal balanced or "washed out" by the flight "crab" angle.

It will now be apparent to those skilled in the art that a novel radio navigation system has been provided by the present invention where, in flying to a radio broadcast station, an arbitrary radio beam reference is established representing a desired course or ground track to be followed to the station against which radio compass and magnetic compass signals are compared to develop a displacement or error signal from the reference for bringing the craft to the desired course reference.

Although but one embodiment of the invention has been illustrated and described, various changes and modifications in the form and relative arrangement of the parts, which will now appear to those skilled in the art, may be made without departing from the scope of the invention.

1. In a radio navigation system for mobile craft for directing said craft along a desired ground track to a desired source of radio waves, said craft being provided with a radio compass and a magnetic compass for developing signals proportional to the displacement of said craft relative to a pre-selected ground track to be followed by said craft, a course setter mechanism for establishing an artificial beam reference corresponding to the desired ground track to be followed by said craft, said mechanism comprising relatively movable stator and rotor elements, means connecting one of said elements to said radio compass for repeating the signal thereof, manually operable means connected to the other of said elements for displacing the latter relative to the first element for modifying said signal, a second device comprising relatively movable stator and rotor elements, one of said last-named elements being connected to one of said first-named elements whereby said modified signal is repeated in said second device, and means responsive to said magnetic compass signal for displacing the other of said last-named elements to change said modified signal.

2. In a radio navigation system for mobile craft for directing said craft along a desired ground track to a desired source of radio waves, said craft being provided with a radio compass and a magnetic compass for developing signals proportional to the displacement of said craft relative to a pre-selected ground track to be followed by said craft, a ground track controller unit, a course setter mechanism located in said unit for establishing an artificial beam reference corresponding to the desired ground track to be followed by said craft, said mechanism comprising a first device having relatively movable stator and rotor elements, means connecting said stator to said radio compass for repeating the signal thereof, manually operable means connected to said rotor for displacing the latter relative to said stator for modifying said signal, a second device located in said unit comprising relatively movable stator and rotor elements, means connecting said last-named stator with said first-named rotor for repeating said modified signal in said second device, and means responsive to said compass signal for displacing said last-named rotor relative to its stator to change said modified signal.

3. A ground track controller unit for automatically directing and maintaining a mobile craft provided with a radio compass thereon along a pre-selected ground track to a desired source of radio waves, said compass including an inductive device in which a signal is developed proportional to the displacement of said craft relative to a pre-selected ground track to be followed by the craft, comprising a three phase wound stator fixedly mounted in said unit and connected to said inductive device for repeating the signal thereof when said craft is displaced relative to said source and an inductively coupled angularly displaceable three phase wound rotor, and manually operable means for displacing said rotor for establishing a desired ground track reference whereby said signal is modified in accordance therewith.

4. A ground track controller unit for automatically directing and maintaining a mobile craft provided with a radio compass and a magnetic compass thereon along a pre-selected ground track to a desired source of radio waves, comprising a three phase wound stator fixedly mounted in said unit and connected to said radio compass for repeating the signal thereof when said craft is displaced relative to said source and an inductively coupled angularly displaceable three phase wound rotor, manually operable means for displacing said rotor for establishing a desired ground track reference whereby said signal is modified in accordance therewith, a second three phase wound stator fixedly mounted in said unit and connected with said rotor for repeating said modified signal, a single phase displaceable rotor inductively coupled with said last-named stator, and means comprising a reversible motor responsive to said magnetic compass signal connected to said single phase rotor for displacing the latter to change said modified signal.

5. A ground track controller unit for automatically steering a mobile craft provided with a radio compass and a magnetic compass thereon along a pre-selected ground track to a desired source of radio waves, comprising a first inductive device having relatively movable stator and rotor elements, one of said elements being connected to said radio compass for repeating the signal thereof in said device when said craft is displaced relative to said track, manually operable means for displacing the other of said elements to modify said signal, a second inductive device electrically connected to said first inductive device and having relatively movable stator and rotor elements for repeating in said second device said modified signal, a third inductive device connected with said magnetic compass for repeating the signal of the latter when said craft is displaced relative to said track and comprising relatively movable stator and rotor parts, a reversible motor connected to one of said parts for energization thereby to displace the latter part to eliminate said last-named signal, and means connecting said motor to one of said elements of said second device to displace the latter and thereby change said modified signal.

6. In a ground track controller unit of the character described a first displaceable inductive device adapted for repeating a radio compass signal, manually operable means for displacing said device to modify said signal, a second displaceable inductive device electrically connected to said first device for repeating said modified signal, a third displaceable inductive device adapted for repeating a magnetic compass signal, a reversible motor electrically connected to said third device energized by said compass signal for displacing the third device to eliminate said compass signal, and means connecting said motor to said second device for displacing the latter to change said modified signal in said second device.

7. In a radio navigation system for mobile craft for directing said craft along a desired ground track to a desired source of radio waves, said craft being provided with a radio compass and a magnetic compass for developing signals proportional to the displacement of said craft relative to a preselected ground track to be followed by said craft, course setter means for establishing an artificial beam reference corresponding to the desired ground track to be followed by said craft comprising a first device having relatively movable stator and rotor elements, means connecting one of said elements to said radio compass for reproducing the signal thereof, a second device comprising relatively movable stator and rotor elements, one of said last-named elements being connected to one of said first-named elements for receiving the signal of said first device, means for developing a control signal corresponding to said magnetic compass signal motor means operable by said control signal and drivably connected for displacing one of the elements of said second device to modify the signal communicated to said second device, and manually operable means connected to displace an element of one of said devices for further modifying the signal appearing at said second device.

CORLES MELVIN PERKINS, Sr.

REFERENCES CITED

The following references are of record in the file of this patent:

UNITED STATES PATENTS

| Number | Name | Date |
|---|---|---|
| 1,958,259 | Becker | May 8, 1934 |
| 2,201,174 | Harding | May 21, 1940 |
| 2,288,102 | Meredith | June 30, 1942 |
| 2,384,004 | Bechberger | Sept. 4, 1945 |
| 2,419,970 | Roe et al. | May 6, 1947 |
| 2,423,337 | Moseley | July 1, 1947 |
| 2,437,251 | Frische et al. | Mar. 9, 1948 |
| 2,460,798 | McCarthy | Feb. 9, 1949 |